United States Patent
Johnson et al.

(10) Patent No.: US 9,484,052 B1
(45) Date of Patent: Nov. 1, 2016

(54) CLEARANCE ADJUSTMENT FOR A HEAD DISK INTERFACE

(71) Applicant: Seagate Technology LLC, Cupertino, CA (US)

(72) Inventors: Michael T. Johnson, Minneapolis, MN (US); Manual Anaya-Dufresne, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/728,409

(22) Filed: Jun. 2, 2015

(51) Int. Cl.
*G11B 5/60* (2006.01)

(52) U.S. Cl.
CPC ..................................... *G11B 5/607* (2013.01)

(58) Field of Classification Search
None
See application file for complete search history.

(56) References Cited

U.S. PATENT DOCUMENTS

| | | | |
|---|---|---|---|
| 6,992,865 B2* | 1/2006 | Thurn | G11B 5/6005 360/234.7 |
| 7,573,682 B2 | 8/2009 | Pust et al. | |
| 7,609,488 B2 | 10/2009 | Bonin et al. | |
| 7,738,216 B2* | 6/2010 | Sato | G11B 5/4826 360/234.3 |
| 7,808,741 B2* | 10/2010 | Matsumoto | G11B 5/54 360/75 |
| 8,004,786 B2* | 8/2011 | Feist | G11B 5/3133 360/75 |
| 8,009,380 B2 | 8/2011 | Matsushita et al. | |
| 8,144,418 B2* | 3/2012 | Watanabe | G11B 5/455 360/75 |
| 8,174,791 B2* | 5/2012 | Aoki | G11B 5/17 360/125.31 |
| 8,730,610 B2 | 5/2014 | McFadyen et al. | |
| 2008/0100965 A1* | 5/2008 | Oki | G11B 5/6005 360/234.3 |
| 2009/0296270 A1* | 12/2009 | Jin | G11B 5/6005 360/97.19 |
| 2014/0029139 A1* | 1/2014 | Engelkes | G11B 5/607 360/235.4 |

* cited by examiner

*Primary Examiner* — Wayne Young
*Assistant Examiner* — James L Habermehl
(74) *Attorney, Agent, or Firm* — Kagan Binder, PLLC

(57) ABSTRACT

A method of controlling clearance in a disk drive, including the steps of: mounting a recording head having at least one heating element at a first distance from a top surface of the disk; measuring a first passive fly height between the top surface of the disk and a bottom surface of the head; applying a first quantity of energy to the heating element(s) to permanently deform the head and change the distance between the top surface of the disk and a bottom surface of the head to a second passive fly height that is less than the first passive fly height; and applying a second quantity of energy to the heating element(s) to temporarily deform the head and change the distance between the top surface of the disk and a bottom surface of the head to an operational clearance distance that is less than the second passive fly height.

10 Claims, 4 Drawing Sheets

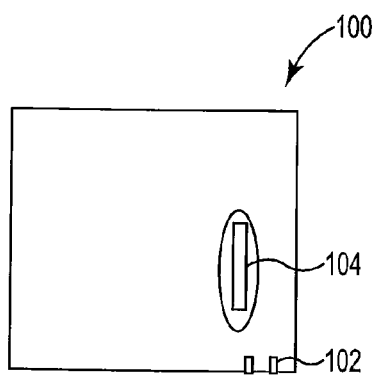
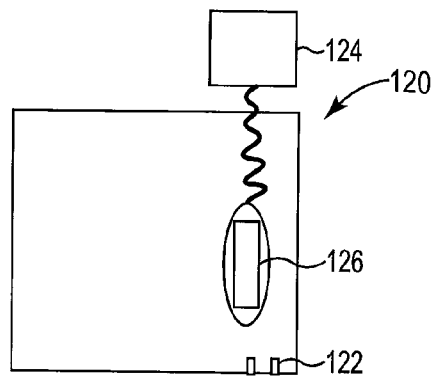
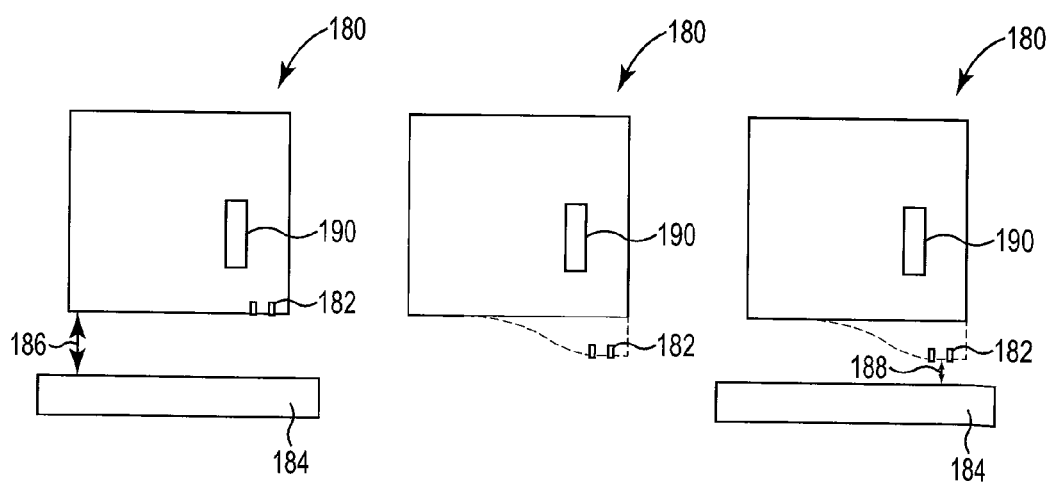

CLEARANCE ADJUSTMENT FOR A HEAD DISK INTERFACE

BACKGROUND

Hard disk drive (HDD) systems typically include one or more data storage disks with concentric tracks containing information. A transducing head carried by a slider is used to read from and write to a data track on a disk, wherein each slider has an air bearing surface that is supportable by a cushion of air generated by one of the rotating disks. The slider is carried by an arm assembly that includes an actuator arm and a suspension assembly, which can include a separate gimbal structure or can integrally form a gimbal.

In more particularity, many disk drives include a transducer that "flies" only a few nanometers above a rotating disk surface. The transducer is mounted in a slider assembly which has a contoured surface. When the disk is at rest, the air bearing slider is in contact with the disk. During operation, the disk rotates at high speed, and an air bearing force is produced by pressurization of the air as it flows between the disk and slider. This air force acts upon a lower air bearing surface of the slider and generates a lift force directing the slider away from the disk and against a load beam causing the slider to fly at an ultra-low height above the disk. Thus, the air force prevents unintentional contact between the transducer and the disk and also provides a very narrow clearance between the slider transducer and the rotating disk. This allows a high density of magnetic data to be transferred and reduces wear and damage. The height at which the read/write head of a slider is positioned above a rotating disk when no reading or writing is taking place is known as the passive fly height, which height is decreased to an operational clearance when reading and/or writing is taking place Because the demand for disk storage systems with large storage capacities is increasing, the density of concentric data tracks on disks is increasing, which in turn requires that the air bearing gap between the transducing head and the rotating disk be reduced to even lower flying heights. During operation of the magnetic data storage and retrieval system, the transducing head is positioned in close proximity to the magnetic media. A distance between the transducer and the media is preferably small enough to allow for writing to and reading from a magnetic medium having a large a real density, and great enough to prevent contact between the magnetic media and the transducer. As the average flying height of the slider decreases, the transducer achieves greater resolution between the individual data bit locations on the disk. Therefore, operational flying height is one of the most critical parameters of magnetic recording.

Part to part variation in manufacturing processes can cause a distribution in fly height for a given head-disk interface design. Many factors impose restrictions on passive fly heights that can be achieved, including changes in ambient conditions, manufacturing and processing variations in the components, and maximum temperature limits of the head itself. In particular, the passive fly height distribution has a maximum limit for high flying heads due to degraded head reliability caused by the high temperatures generated by heat actuators of the head that are activated to modify the head to achieve a desired operational clearance. This limit constrains the allowed design space and can reduce factory yields because heads with too high of a passive fly height are not usable and are generally scrapped, which can greatly reduce yields. Thus, a need exists for an air bearing slider design which is adjustable to achieve a constant, ultra-low transducer flying height, despite certain mechanical limitations.

SUMMARY

In accordance with aspects of the invention, a heating source is provided to permanently deform a magnetic recording head to provide a one-time passive fly height adjustment. This controlled adjustment is designed to be local to the transducer region of the head and will bring high flying heads to passive clearance levels that are in a more desirable range and therefore have desired operating temperatures.

The heating source of the invention can be an existing element that is present in the head, such as a heating actuator, or can instead be a dedicated heating source. The operational parameters of the heating actuator or heating source, such as the time and the applied power, are controllable to adjust the amount of head deformation or protrusion and thus the fly height correction applied to a specific head. This correction can be applied off disk or on disk. In either case, the heating source and region to be deformed are designed so that sufficient temperatures are achieved to provide the desired shape change. The amount and profile of shape change desired for a given head can be determined by assessing contact powers or clearance measurements on an electrical tester, for example. In a case where the head is being adjusted while on a tester prior to placing it on a disk drive, the head can be immediately checked to confirm that the head has been properly adjusted to a desired operating temperature. If the head has operational heater powers that are too high, for example, the head can be adjusted while still on the tester.

In one aspect of the invention, a method is provided for controlling clearance in a disk drive between a disk and a magnetic recording head of a slider, the method including the steps of: mounting the head at a first distance from a top surface of the disk, wherein the head has at least one heating element. The steps further include measuring a first passive fly height between the top surface of the disk and a bottom surface of the head; applying a first quantity of energy to the at least one heating element to permanently deform the head and change the distance between the top surface of the disk and a bottom surface of the head to a second passive fly height that is less than the first passive fly height; and applying a second quantity of energy to the at least one heating element to temporarily deform the head and change the distance between the top surface of the disk and a bottom surface of the head to an operational clearance distance that is less than the second passive fly height. The first quantity of energy can be the same or different from the second quantity of energy applied to the head. The heating elements and quantity thereof can vary, wherein the head can include two heating elements, can comprise at least one heating element integrated into a transducer region of the head, can comprise a heat actuator or laser, and/or can be externally positioned relative to the transducer region of the head.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein:

FIG. 3 is a schematic side view of an embodiment of a read/write head with an internally located heating source, in accordance with the invention;

FIG. 4 is a schematic side view of an embodiment of a read/write head with an externally located heating source, in accordance with the invention;

FIG. 6 is a schematic side view of a read/write head positioned at an initial passive fly height distance from a disk;

FIG. 7 is a schematic side view of the read/write head of FIG. 6 after the application of a controlled amount of heat to the reader/writer area of the head; to provide controlled deformation thereof; and FIG. 8 is a schematic side view of the read/write head of FIG. 7 as positioned at a decreased passive fly height distance from a disk.

DETAILED DESCRIPTION

Figure 1:
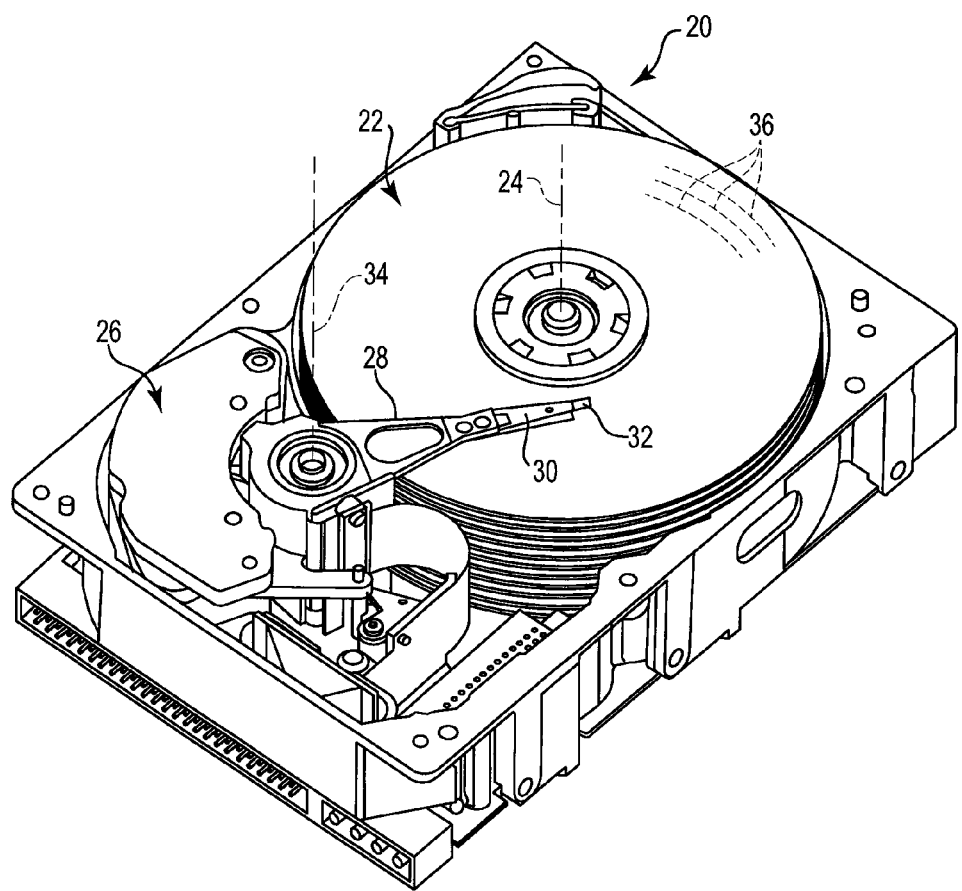
FIG. 1 is a perspective view of an exemplary hard disk drive (HDD) system.

Referring now to the Figures, wherein the components are labeled with like numerals throughout the several Figures, and initially to FIG. 1, an exemplary configuration of a typical hard disk drive (HDD) system 20 is illustrated. The HDD system generally includes at least one magnetic storage disk 22 configured to rotate about an axis 24, an actuation motor 26 (e.g., a voice coil motor), an actuator arm 28, a suspension assembly 30 that includes a load beam, and a slider 32 carrying a transducing or read/write head (not shown). Slider 32 is supported by suspension assembly 30, which in turn is supported by actuator arm 28. Together, actuator arm 28, suspension assembly 30 and slider 32 form a head stack assembly (HSA). Actuation motor 26 is configured to pivot actuator arm 28 about an axis 34, in order to sweep suspension 30 and slider 32 in an arc across a surface of rotating disk 22 with slider 32 "sliding" or "flying" across disk 22 on a cushion of air, often referred to as an air bearing. The read/write head carried by slider 32 can be positioned relative to selected concentric data tracks 36 of disk 22 by a piezoelectric microactuator, not seen in FIG. 1. A stack of co-rotating disks 22 can be provided with additional actuator arms 28, suspension assemblies 30, and sliders 32 that carry read/write heads for reading and writing at top and bottom surfaces of each disk 22 in the stack.

Figure 2:
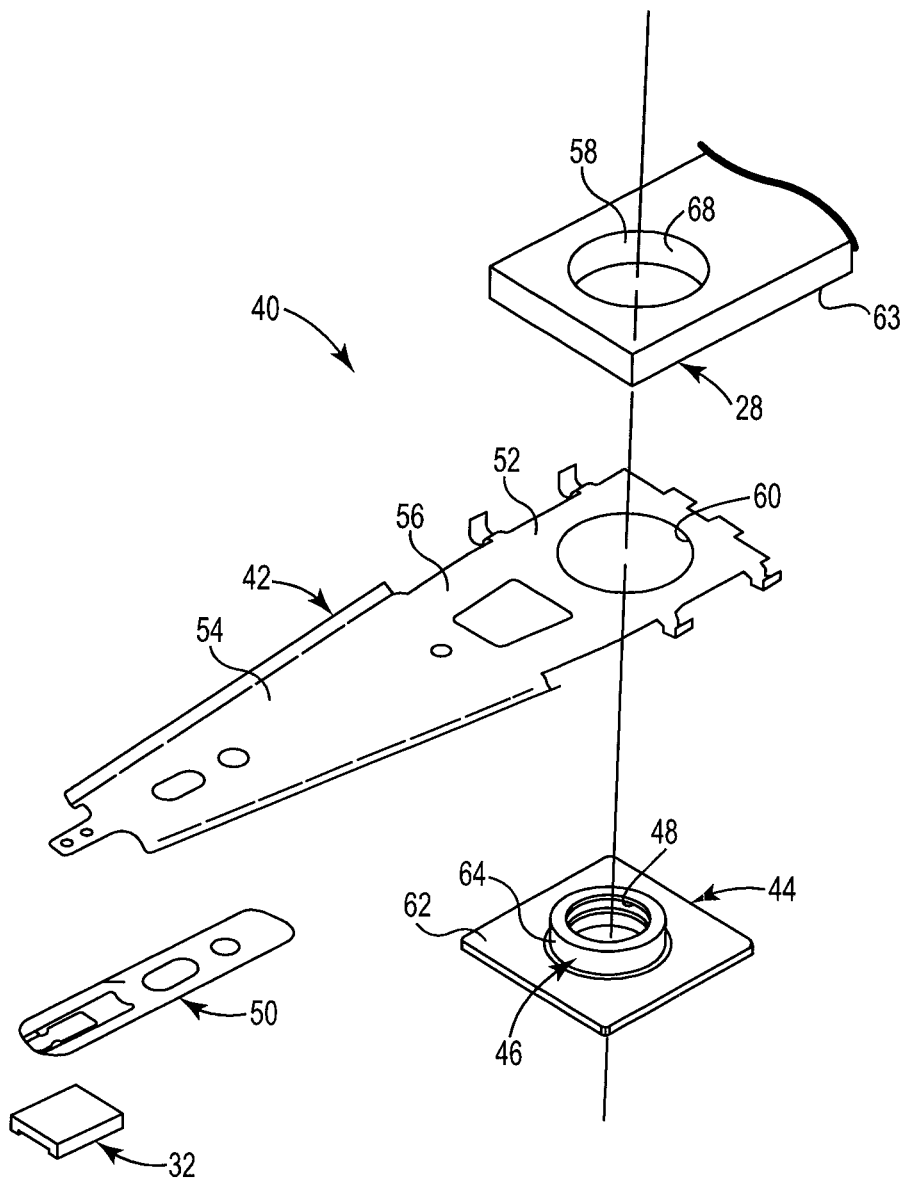
FIG. 2 is a perspective view of an exploded head stack assembly of the type that can be used in an HDD system, such as the system illustrated in FIG. 1.

In order to better illustrate sliders and associated components of the type discussed herein relative to the invention, FIG. 2 provides an exploded, perspective view of a typical head stack assembly (HSA) 40 of FIG. 1, which includes a load beam 42, actuator arm 28, and a base plate 44 with an upwardly projecting boss tower 46. In the illustrated embodiment, HSA 40 includes a flexure piece 50 to which slider 32 (which includes a transducing or read/write head) is mountable. Flexure 50 may be attached to load beam 42 by any conventional mechanism or may be integral with load beam 42. In some embodiments, load beam 42, flexure 50 and slider 32 can be referred to as a head suspension assembly. Load beam 42 includes a mounting region 52 at a proximal end, a rigid region 54 adjacent to the distal end of the load beam 42, and a spring region 56 between the mounting region 52 and rigid region 54. An aperture 60 is extends through the mounting region 52. Spring region 56 is relatively resilient and provides a downward bias force at the distal tip of load beam 42 for holding the slider 32 with read/write head near a spinning disk in opposition to an upward force created by the air bearing over the disk. HSA 40 is typically coupled to actuation motor 26 of the type illustrated in FIG. 1, for example, via actuator arm 28 that is attached to mounting region 52 of load beam 42.

The read/write heads described above are carried by a slider that is used to read from and write to a data track on a disk. The slider is carried by an arm assembly that includes an actuator arm and a suspension assembly, which can include a separate gimbal structure or can integrally form a gimbal. In a typical process, an array of sliders are formed on a common substrate or an AlTiC wafer which is then sliced to produce bars, with a row of sliders in a side-by-side pattern on each bar. The bars (which can be referred to as row bars) are then subjected to a series of processes to form individual sliders, including lapping, cleaning, formation of air-bearing surfaces (ABS), and dicing.

Referring now to FIG. 3, a schematic side view of a read/write head 100 is illustrated, which generally includes reader/writer 102 and a heating source 104 that is internal or integrated into the head 100 to provide an initial, one-time clearance adjustment. The integrated heating source 104 can be a dedicated element that is provided specifically for the adjustments of the present invention, or can be an existing heating element that is integrated into the head 100 for other purposes, such as actuation. The heating source 104 can provide heat via joule heating, for example.

The integrated heating source 104 of the head 100 is positioned in a location so that the material from which the head 100 is made can expand sufficiently and in a controlled manner to provide a desired clearance adjustment (i.e., reduce the clearance between the head and an adjacent disk), but also so that it does not damage temperature sensitive elements of the head 100. The heating source 104 is sized, shaped, positioned, and otherwise configured so that when it is heated to a certain temperature for a specific period of time, a change in the profile of the read/write head will be accomplished in a predictable and repeatable manner FIG. 4 is a schematic view of a read/write head 120, which includes a reader/writer 122 and a heating source 124 that is positioned external to the head 120 itself. The heating source 124 is in communication with an absorber element 126 that is positioned in a particular location of the head 120 to provide a desired head deformation. Heating source 124 can be permanently attached to the head 120, or can instead be removably attached to the head 120. One exemplary heating source 124 is a laser that provides controlled energy to the head 120 to cause the desired deformation of the head 120. In particular, the laser can be focused through the material of the head 120 (e.g., alumina) to a feature positioned in a particular area inside the head 120 or on its exterior surface.

Although examples of an integrated heating source 104 and an external heating source 124 are described briefly above, it is understood that the heating source can include a wide variety of heating elements, and that any heating source that can heat a predetermined area of the read/write head to a desired temperature can be used to cause controlled deformation of the head. In addition, it is understood that a read/write head can include single or multiple heating sources made of the same or different materials to provide a desired deformation profile. It is further understood that if multiple heating sources are provided, they can either be internal to the read/write head, external to the read/write head, or a combination of internal and external heating sources.

In accordance with the invention, the desired area or areas to be deformed of a read/write head are precisely calculated so that when the heating of that area occurs, the head can deform to match a predicted profile. In addition, each area to be deformed is made of a material that can predictably deform in response to a certain quantity and duration of heat provided from the heating source. For one example, the material of the head itself can be used to provide the head deformation, such as alumina. Alternatively, a specially designed or selected block of material can be incorporated into the head to allow for the desired deformation. The added block of material can be designed to provide the a desired deformation in the transducer region of the head to create the clearance adjustment. The material chosen can be selected based on the desired performance and ease of implementation in the head design.

The deformable material of the invention is generally provided to be permanently or semi-permanently deformed, although permanent deformation will be preferred in certain aspects of the invention. Such permanent deformations can be considered to be plastic deformations in that the material will retain its deformed configuration after removal of heat or other activation energy.

Further in accordance with the invention, deformation of a read/write head will depend on the applied heating power and the time the power is applied. An empirically derived relation between these two inputs and the desired clearance change will be determined for a given head design, as is illustrated in the flow chart 140 of FIG. 5. This flow chart 140 illustrates an exemplary procedure for determining a relationship between heating source operation and the deformation that causes a decrease in contact power or clearance. The flow chart is for a fixed heating source, but a similar procedure can be used for determining the length of time the heating source will be applied to achieve a desired head deformation.

Figure 5:
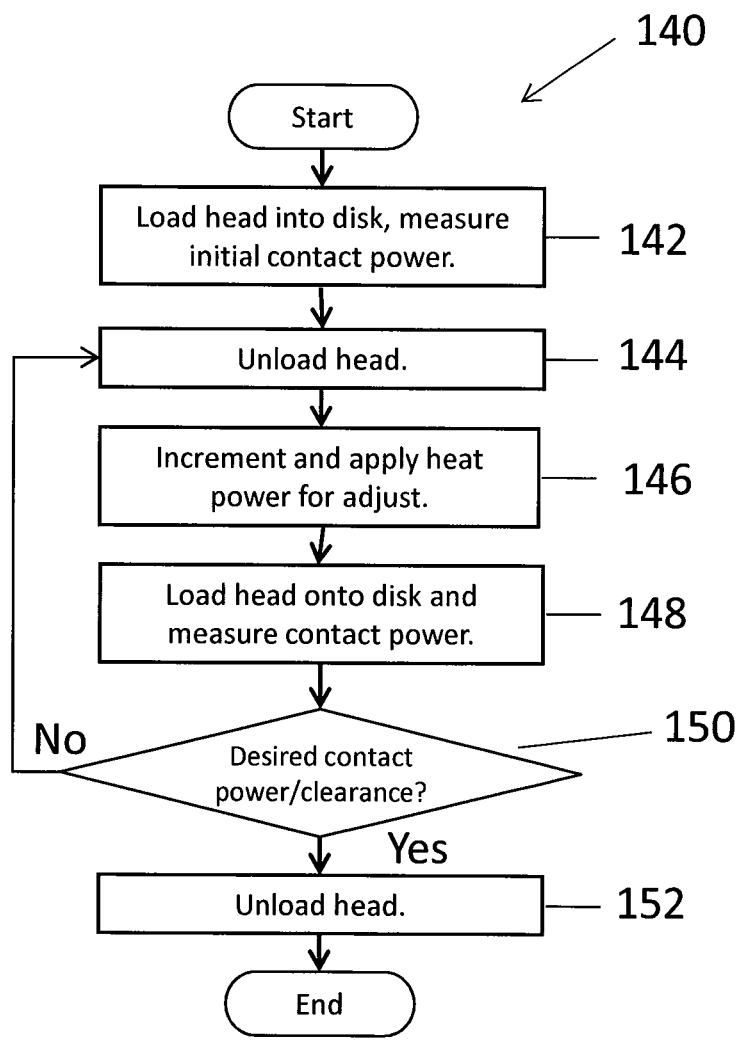
FIG. 5 is a flow chart depicting an embodiment of a series of steps that are performed in accordance with the invention to provide a desired deformation of a read/write head.

As discussed below relative to the flow chart 140 of FIG. 5, the relationship between deformation of a particular head and applied power can be determined on an electrical or a mechanical tester by applying increasing amounts of power from a heating source for a given length of time. In between heat power steps, the head is loaded onto the disk and the contact power or clearance is measured. This procedure produces a transfer function between the decrease in contact power or clearance and the amount of heating power applied to the head. The transfer function between the length of time the heating power is applied and the clearance change is determined in a similar way. This can be performed using a fixed heater power and increasing the time the power is applied. If the maximum temperature provided by the head source is not exceeded during operation, measurements of off disk head shape is shown to not change with repeated heating source cycling. After this procedure, the clearance change as a function of both heating source power and duration will have been determined.

The particular steps provided in an exemplary procedure of the invention are depicted in the flow chart 140, which starts with step 142 of loading a head with particular characteristics onto a disk, and measuring the initial contact power. The next step 144 is unloading the head, and then applying a desired amount of heat to the head (step 146) that may be needed to achieve a certain amount of deformation of the head and the corresponding adjustment of the clearance. The head can then be loaded onto a disk to simulate an actual loaded disk in operation (step 148), and the contact power is measured. If the desired contact power or clearance is achieved (step 150), the head is unloaded (step 152) and the adjustment is complete. If the desired amount of contact power or clearance is not achieved, the head can then be unloaded again (step 144), and an incremental amount of power is again applied to the head (step 146). The head is loaded onto a disk again to simulate a loaded disk in operation, and the contact power is measured. The process can be repeated until the desired contact power or clearance is achieved.

Once the relationship between heat applied and corresponding deformation for a particular head design is determined, this relationship can be applied to individual heads that have contact powers or clearances that are measured to be too high, as is illustrated in FIGS. 6-8, for example. For such a head, a predetermined amount of heating power (as determined by the above method, for example) is applied to bring contact power or clearance down to an acceptable level. Because the adjustment can be performed on the tester, the clearance adjustment can be immediately verified. If desired, the adjustment can be done incrementally. In this case, a series of smaller adjustments can be performed to bring head to the desired passive clearance.

Referring to FIG. 6, an exemplary read/write head 180 is illustrated, which is positioned relative to a disk 184 (also referred to as "on-disk") with a reader/writer 182 being located at a distance 186 from the disk 184 that is equivalent to a representative initial passive fly height. In this position, the contact power is measured to determine the adjustment that may be required to reposition the reader/writer 182 at the desired distance from the disk 184. A certain quantity of power can then be applied to a heating source 190 of the read/write head 180 to provide the desired deformation to adjust the clearance, wherein the heating source can be an integrated or external heating source, as discussed above. FIG. 7 illustrates the deformed head 180, in which the reader/writer 182 has been permanently deformed by the heat that was applied by the heating source 190 in such a way that the reader/writer 182 will be closer to the disk 184 than in FIG. 6. The read/write head 180 is then positioned above disk 184 and the clearance between the reader/writer 182 and the disk 184 is measured, which will be a reduced passive fly height distance 188 than the initial passive fly height distance prior to the application of heat, as is schematically illustrated in FIG. 8.

Although FIGS. 6-8 illustrate a situation where the clearance adjustment is performed off-disk, it is understood that the adjustments can instead be made when the reader/writer is on-disk. That is, the head will not be unloaded as in FIG. 7, but instead will remain positioned with the reader/writer spaced slightly from the top surface of the disk during the process of applying heat via the heating source to cause the desired deformation.

After the deformation of the read/write head is complete, a functional passive fly height for the head will be established. At this point, the head can be used in a disk drive in such a way that heat or other activation energy can be applied to move the head from a passive fly height to an operational fly height so that reading and writing operations can take place.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A method of controlling clearance in a disk drive between a disk and a magnetic recording head of a slider, the method comprising the steps of:
   mounting the head at a first distance from a top surface of the disk, the head comprising at least one heating element;
   measuring a first passive fly height between the top surface of the disk and a bottom surface of the head;
   applying a first quantity of energy to the at least one heating element to permanently deform the head and change the distance between the top surface of the disk and a bottom surface of the head to a second passive fly height that is less than the first passive fly height; and
   applying a second quantity of energy to the at least one heating element to temporarily deform the head and change the distance between the top surface of the disk and a bottom surface of the head to an operational clearance distance that is less than the second passive fly height,
   wherein the at least one heating element is externally positioned relative to a transducer region of the head.

2. The method of claim 1, wherein the first quantity of energy is different from the second quantity of energy.

3. The method of claim 1, wherein the at least one heating element comprises at least a first heating element and a second heating element.

4. The method of claim 1, wherein the at least one heating element comprises a laser.

5. The method of claim 1, wherein the recording head further comprises a heat absorber.

6. The method of claim 1, wherein the at least one heating element comprises multiple heating elements.

7. The method of claim 6, wherein the each of the multiple heating elements comprises different material properties from at least one of the other heating elements.

8. The method of claim 6, wherein the recording head further comprises multiple heat absorbers, and wherein each of the multiple heating elements is in communication with a corresponding heat absorber of the multiple heat absorbers.

9. The method of claim 1, further comprising the steps of:
   measuring a passive fly height after the step of applying a first quantity of energy to the at least one heating element and before applying a second quantity of energy to the at least one heating element;
   comparing the measured passive fly height to a predetermined passive fly height; and
   applying an incremental quantity of energy to the at least one heating element to further permanently deform the head and change the distance between the top surface of the disk and the bottom surface of the head to an incremental passive fly height that is less than the first passive fly height but greater than the second passive fly height.

10. The method of claim 9, further comprising the steps of repeating the step of applying an incremental amount of energy to the at least one heating element until the second passive fly height is achieved.

* * * * *